United States Patent [19]
Trevett et al.

[11] Patent Number: 5,008,754
[45] Date of Patent: Apr. 16, 1991

[54] ANALOG CONTROLLED MIXER

[75] Inventors: Neil F. Trevett, Kingston upon Thames; Malcolm E. Wilson, Bridport, both of England

[73] Assignee: Du Pont Pixel Systems, Limited, United Kingdom

[21] Appl. No.: 327,242

[22] Filed: Mar. 22, 1989

[30] Foreign Application Priority Data

Mar. 23, 1988 [GB] United Kingdom ............... 8806881

[51] Int. Cl.⁵ ..................... H04N 5/265; H04N 5/272
[52] U.S. Cl. ..................................... 358/183; 358/22; 358/181
[58] Field of Search ............... 358/183, 22, 181; 307/475

[56] References Cited

U.S. PATENT DOCUMENTS

| | | | |
|---|---|---|---|
| 4,599,611 | 7/1986 | Bowker et al. | 358/22 |
| 4,678,944 | 7/1987 | Williams | 307/475 |
| 4,700,232 | 10/1987 | Abt | 358/22 |
| 4,774,583 | 9/1988 | Kellar | 358/183 |
| 4,779,135 | 10/1988 | Judd | 358/183 |
| 4,811,084 | 3/1989 | Belmares et al. | 358/22 |
| 4,827,253 | 5/1989 | Maltz | 358/22 |
| 4,845,565 | 7/1989 | Macheboeuf | 358/181 |
| 4,922,345 | 5/1990 | Barton | 358/183 |

FOREIGN PATENT DOCUMENTS 2508712 9/1976 Fed. Rep. of Germany .
1503612 3/1978 United Kingdom .

OTHER PUBLICATIONS

Carlson, et al.; *Electrical Engineering Concepts and Applications,* Addison-Wesley Publishing Co.; Reading, MA; 1981; pp. 573-574.

*Primary Examiner*—Tommy P. Chin
*Attorney, Agent, or Firm*—Sterne, Kessler, Goldstein & Fox

[57] ABSTRACT

A system and method for merging two or more analog video signals under control of a third analog video signal. A standard video output from one processor's video signal digital to analog converter (DAC) is used as the control signal for the merging of two or more other video signals. This enables the video outputs of even highly diverse processing schemes to be easily merged. In its preferred embodiment, the system includes analog switching circuitry which is used to mix the video outputs from two or more different systems. The system also includes circuitry which converts the standard video output from a third processor into a large swing TTL signal which is used to control the analog switch.

20 Claims, 5 Drawing Sheets

ANALOG CONTROLLED MIXER

BACKGROUND OF THE INVENTION a. Field of the Invention

This invention relates to the field of graphics and image processing.

b. Related Art

In the field of imaging and graphics it is often necessary or desirable to be able to mix two or more video signals for display on a video monitor. For example, a window containing a video image from one graphics processor may be inserted onto the video display of another graphics processor, or any other video source such as a camera output or video recording device. Another application would be the creation of video overlays where the video output information from one graphics processor is mixed with the output of a second video source such that certain colors on the first video output are treated as being transparent, i.e. allowing the second source to be visible.

One conventional method of mixing two video signals is by digitally combining the output signals before they are converted into an analog video signal. In order to mix the video outputs from separate systems, the system's processors are synchronized and connected to a common digital pixel data bus. The selection of which video signal to enable onto the pixel bus at any given position on the video display is made by a digital output select control signal. This signal could be produced by a window signal generating circuit or as some function of the image stored in one of the video output generators (for overlays).

The problems with conventional digitally controlled techniques are several fold. First, the hardware required to perform the mixing at the level where the video information is still in its digital form is relatively cumbersome and complex. All of the systems must either be using a commonly structured internal pixel data format or communicate via specially designed interfaces. Also, digital switching techniques are generally slow (compared to the analog video signals) and may degrade system performance unless functioning with a great degree of parallelism (which increases circuit complexity).

SUMMARY OF THE INVENTION

The invention comprises a system and method for merging two or more analog video signals under control of a third analog video signal. The inventors have discovered that a standard video output from a processor's video signal digital to analog converter can be used as the control signal for the merging of two or more other video signals.

In its preferred embodiment, the system includes analog switching circuitry which is used to mix the video outputs from two or more different systems. Advantageously, the system also includes circuitry which converts the standard video output from a third processor into a large swing TTL signal which is used to control the analog switch.

The present system and method offer significant advantageous over conventional video mixing techniques. First, video signal output standards are well defined. As long as two or more systems are using the same standard, their video signals can be mixed using a video signal from another system using the same standard. A further advantage is that aside from the mixer itself, no extra hardware is necessary to accomplish the mixing no matter how the pixel data is formatted or handled by each video source internally. Using the present system and method, video signals from two vastly different systems can be easily and inexpensively merged.

Also, the analog video signals are available virtually for free. All video processors have an analog video output by their very definition. Many video processors have more than one video DAC (digital to analog convertor) available as a secondary output as well. The present system and method can be easily employed because any given analog video output, from any video DAC, on any system, can be used as a control signal in the merging of the remaining video outputs.

Further, video signals are fast. In digitally controlled switching, the digital control signal must keep up with the video output in order for the video signals to be properly mixed. In the present system and method, where one video signal is used to control the mixing of other video signals of the same standard, speed and timing are not a factor. As long as the processors are being commonly clock, then speed and synchronization naturally take care of themselves.

BRIEF DESCRIPTION OF THE DRAWINGS

The invention is better understood by reference to the following drawings.

DETAILED DESCRIPTION OF THE PREFERRED EMBODIMENTS.

Figure 1:
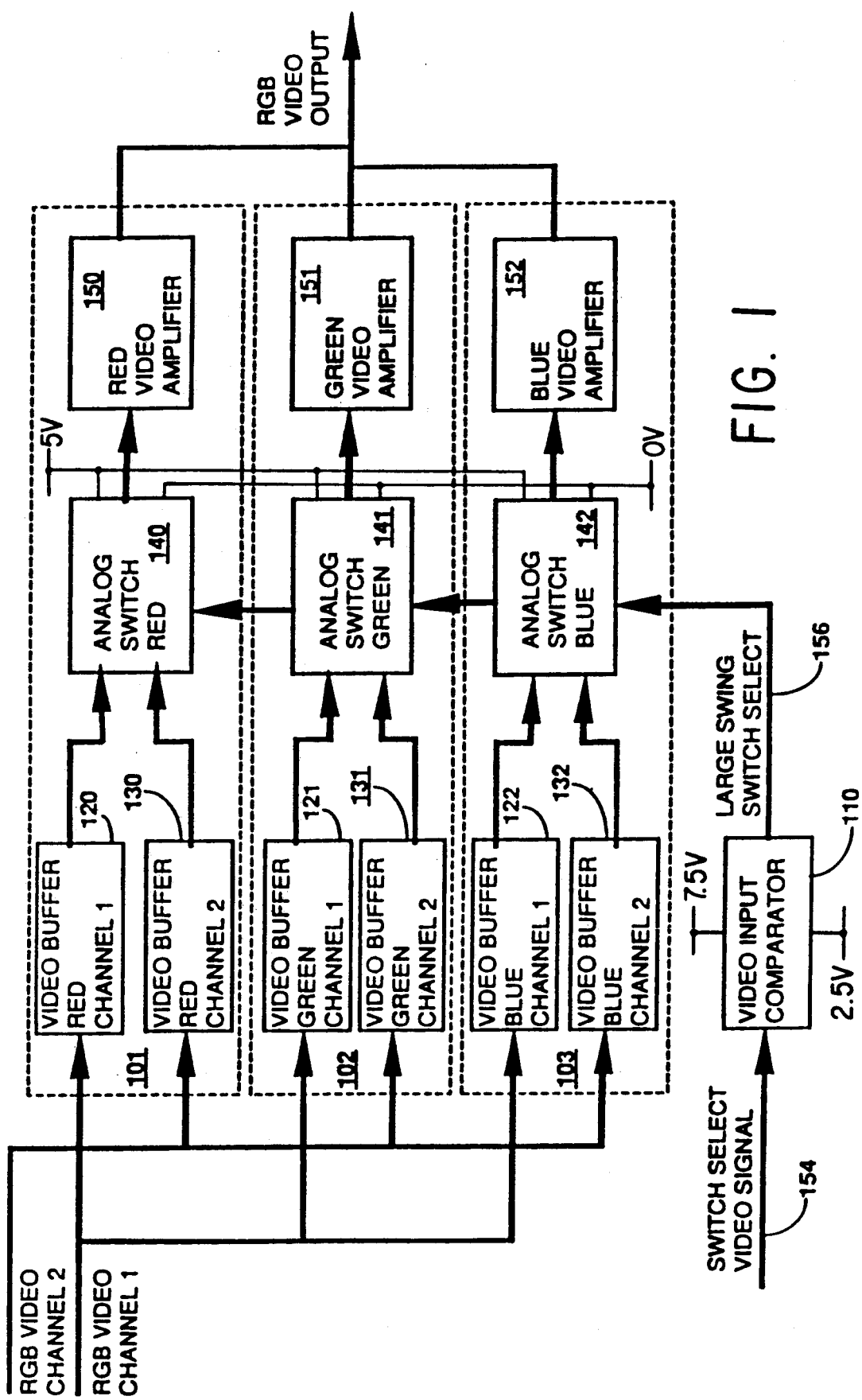
FIG. 1 is a general block diagram of the present system, showing the merging of two separate video channels, each channel having three video color signals, under control of a separate analog video switching signal.

Referring to FIG. 1, the preferred embodiment of the present system and method includes three 2-1 analog mixers 101, 102, 103 the mixing being controlled by a video input comparator 110. Each analog mixer comprises an input buffer for channel 1 120, 121, 122 and an input buffer for channel 2 130, 131, 132, an analog switch 140, 141, 142 and an output video amplifier 150, 151, 152.

The input channel buffers 120, 130, 121, 131, 122, 132 are designed using a unity gain buffer device with a bandwidth great enough to not visibly degrade the video signal, which in a high resolution display can have a pixel clock rate of 109 Mhz. The presently preferred unity gain buffer device is an EL2005CG available from Elantec of Milpitas, Calif., U.S.A.

The analog switches 140, 141, 142 have a bandwidth great enough to allow no visible degradation of the video signal and must also allow the transmission of the signal to be enabled and disabled at high speed. The speed should preferably be less than the time for one output pixel (at 109 Mhz this is approximately 9.2 nanoseconds). The analog switch used in the preferred embodiment is an SD5000N produced by Siliconix of Santa Clara, Calif., U.S.A.

The video amplifiers 150, 151, 152 must also degrade the display as little as possible. The function of the amplifier is the return to voltage levels to those required for the video standard being used (in this embodiment the video standard is RS-343A but other standards such as RS-170 may be used), and to buffer the output to the correct impedance value for the video standard (typically 75 ohms). The preferred embodiment of the video amplifiers uses an EL2022G produced by Elantec of Milpitas, Calif., U.S.A.

Figure 4:
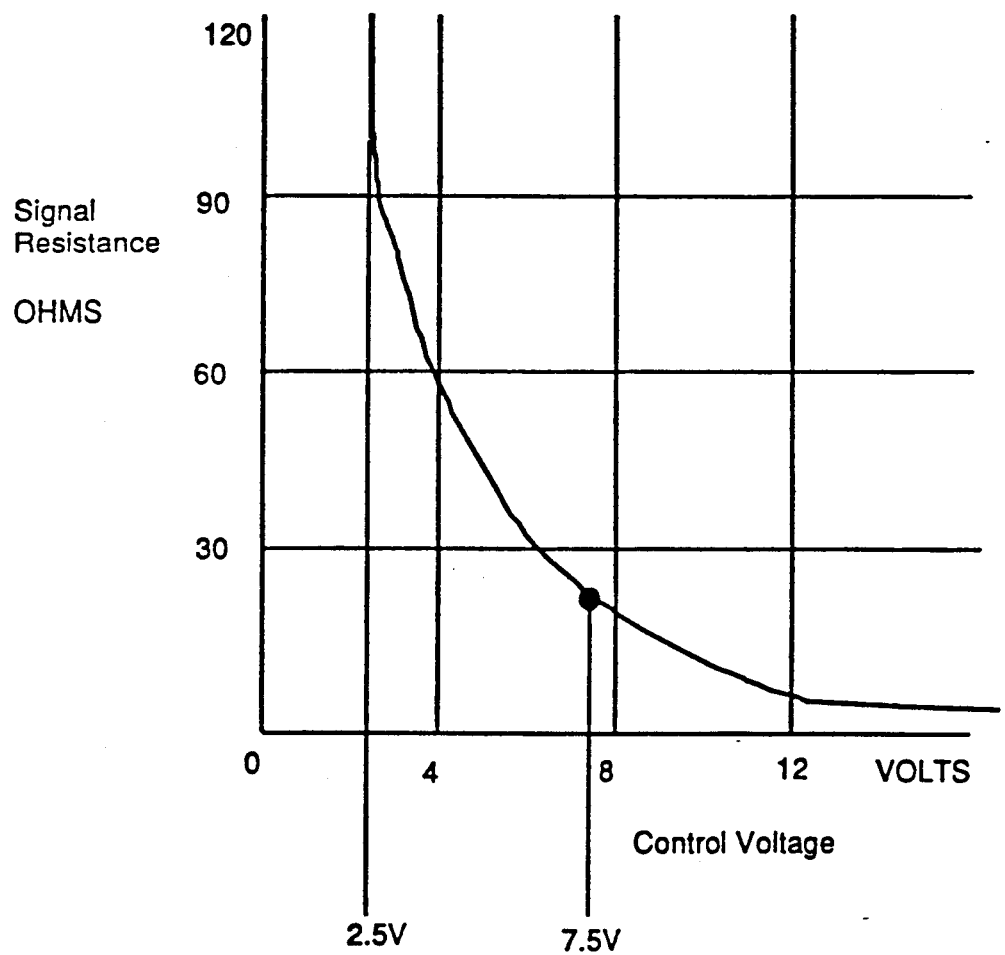
FIG. 4 is a diagram showing the general curve of the transfer characteristic of the analog switch of FIG. 1.

The video input comparator 110 must convert the switch select video signal 154 to a large swing switch select signal 156. This is necessary to ensure that the analogue switch control input fully enables and disables the video paths. FIG. 4 shows the approximate transfer function for the switch type SD5000N.

Figure 2:
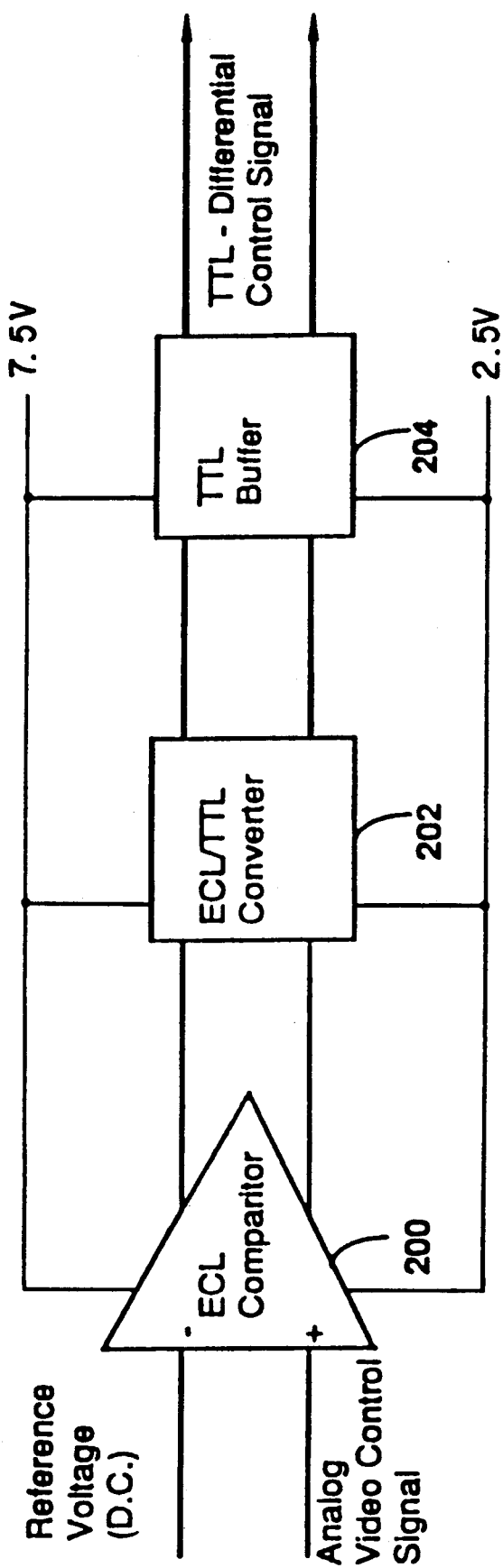
FIG. 2 is a more detailed block diagram showing the video input comparator block of FIG. 1.

The switch signal 156 produced by the preferred embodiment has an 'off' level of 2.5 volts and an 'on' level of 7.5 volts. These levels allow for the video paths to be fully enabled and disabled with a margin to allow for any noise in the circuitry. The preferred embodiment of the present system and method uses three devices to produce this large swing signal; an ECL comparator 200 (type VTC002 produced by VTC Incorporated of Bloomington, Minn., U.S.A.), an ECL to TTL convertor 202 (type MC10H125P produced by Motorola, U.S.A.) and a TTL buffer 204 (type V74FCT245 produced by VTC Incorporated). The configuration of these devices is shown in FIG. 2.

An analog video control signal (which is a standard video signal just as displayed signals) enters this series of circuits at the input of the ECL comparator 200. As the video control signal goes above and below the D.C. reference voltage input, the comparator's output will switch between ECL levels. These devices 200, 202, 204 are run from a power supply which is level shifted by 2.5 volts from that used by the video display circuitry 302, 304, 306, 308. This produces a voltage swing of 2.5 volts to 7.5 volts on the control input of the analog switches relative to the analog ground as the TTL buffer is producing differential signals at standard TTL levels (0 volts to 5 volts) relative to its ground level.

The reference voltage to the comparator is set so that the comparator will switch at 0.375 volts. This allows a standard video signal to switch the comparator with a margin for noise. The switch select video signal would normally be configured to only have full white and full black signal levels to ensure good noise margins in the comparator circuitry. These levels would normally be produced by manipulating the video output palettes on the output producing the control signal.

In this preferred embodiment, the devices in the video input comparator path introduce a fixed delay between the large swing switch signal and the signals from channels 1 and 2. As all video sources are synchronized it is necessary to allow for this delay in some way. In the preferred embodiment the video cables for the two channels are made longer than the cable used for switch select video signal, the length being chosen to give a delay equal to that introduced by the video input comparator.

All the circuitry contained in the analog mixer is running at great speed (up to, for example, about 109 Mhz). Those with knowledge of the art will realize the care which must be taken in circuit layout to ensure correct operation of such an apparatus.

Figure 3:
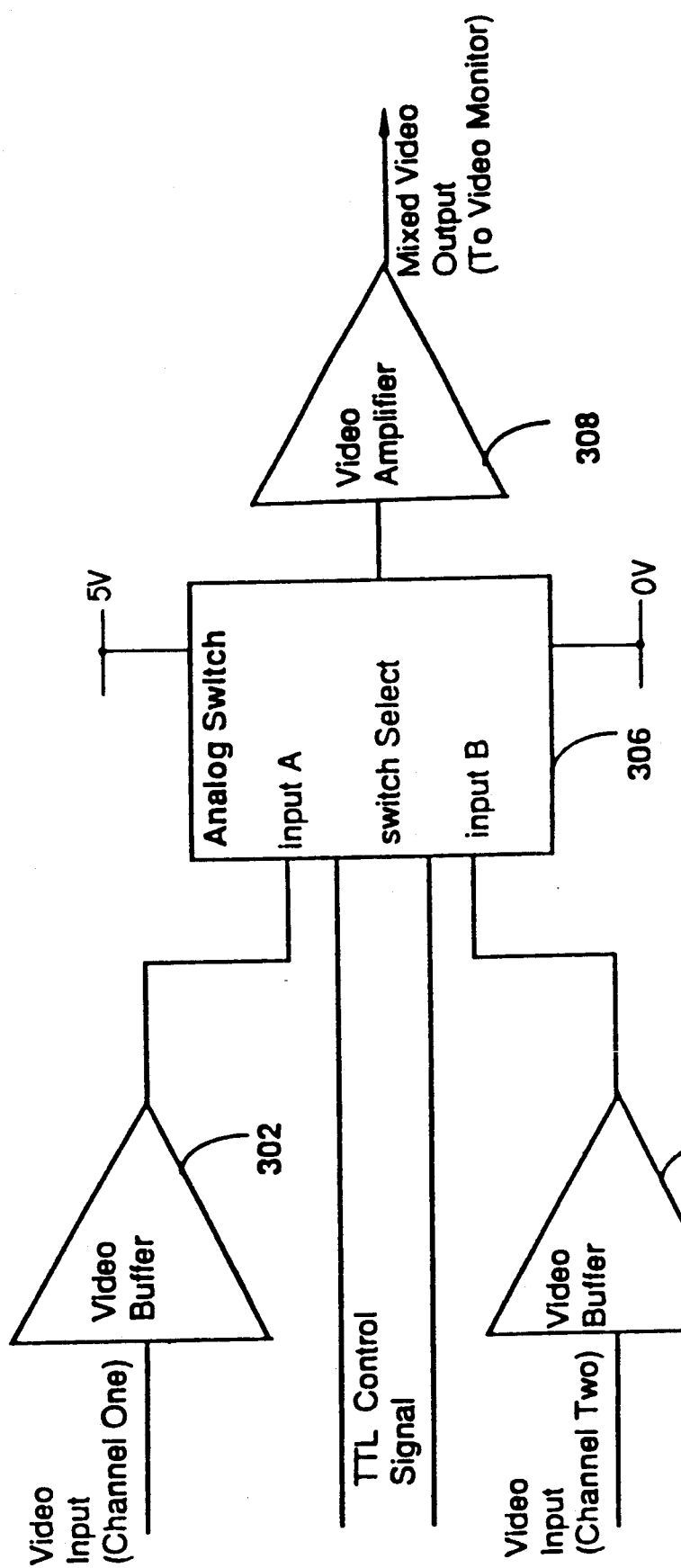
FIG. 3 is a more detailed block diagram showing the video buffer, analog switch and video amplifier blocks of FIG. 1.

The operation of the system and method will now be described by reference to FIGS. 2 and 3. A video signal from a first processor (not shown) will arrive at the input to a first video buffer 302. Another video signal from a second processor will arrive at the input of the second video buffer 304. The video buffers will perform current buffering and transmit the signals to the input A and input B lines of the analog switch 306. A large swing TTL control signal (generated by a third processor's video signal) will arrive at the switch select inputs synchronous with the two video signals and will cause the analog switch 306 to fully select either input A or input B. The TTL signal is synchronous with the two video signals because all of the processor video output clocks are either tied or locked together.

Because all three signals are synchronous, the video signal from the third processor will cause a pixel or series of pixels from the selected processor to be displayed. The video amplifier 308, takes the video signal and brings it back to correct levels for the chosen video standard.

Figure 5:
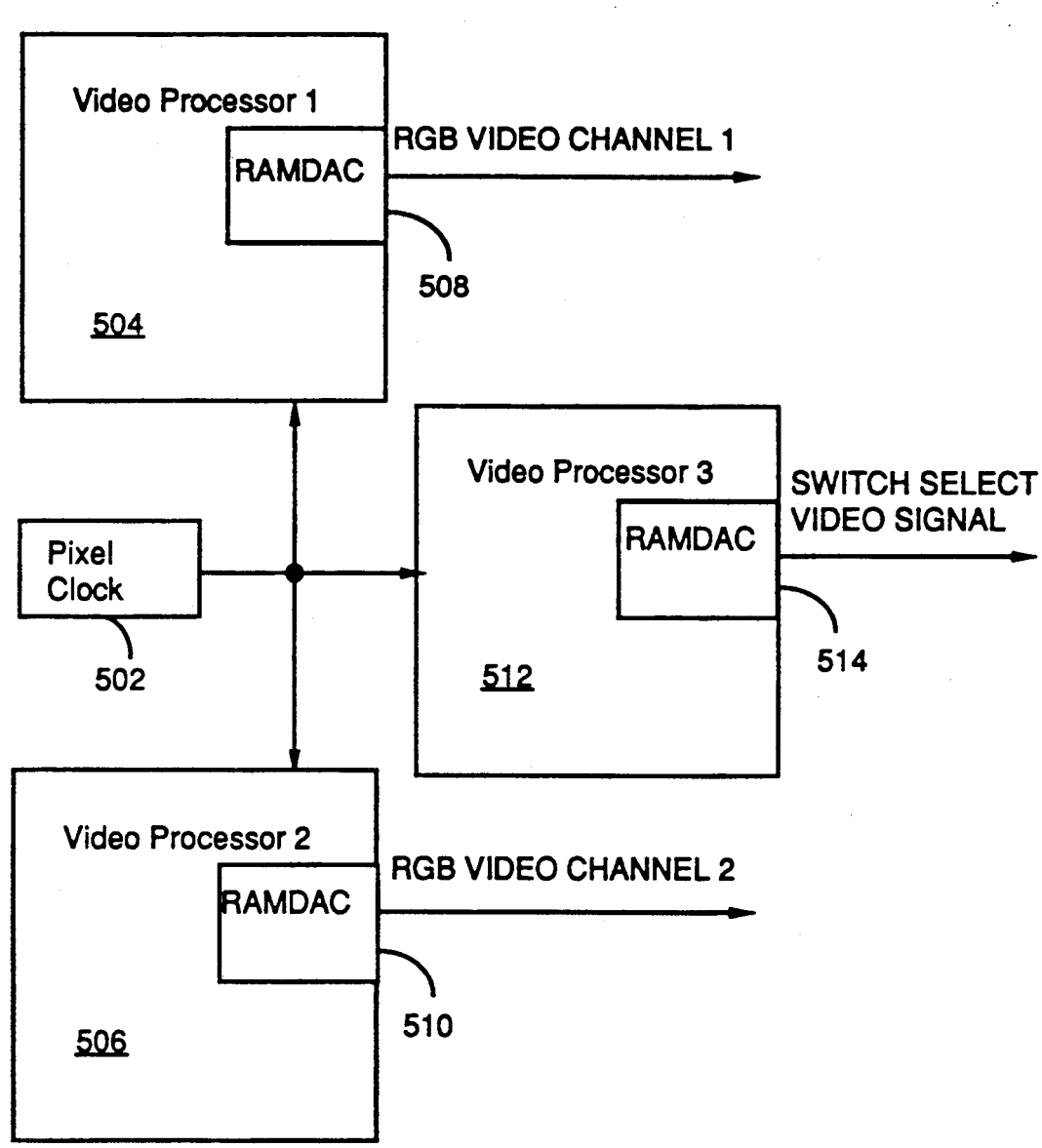
FIG. 5 is a diagram showing the interconnection of a common pixel clock with three video processors.

Advantageously, all of the video signals (the two video data signals and the video control signal) can be taken from any processor's standard video output (e.g. from a ramdac). FIG. 5 is a diagram showing the interconnection of a common pixel clock 502 with three video processors 504, 506, 512 in accordance with one embodiment of the present invention. The video data signals for channels 1 and 2 are taken from ramdacs 508 and 510 respectively. The video control signal (the switch select video signal) is taken from ramdac 514.

The following books are, in their entirety, incorporated into this specification by reference: Siliconix INTEGRATED CIRCUITS DATA BOOK, (March 1985 edition), available from Siliconix Incorporated of 2201 Laurelwood Road, Santa Clara, Calif.; Elantec 1987 DATA BOOK, available from Elantec, 1996 Tarob Court, Milpitas, Calif. Each of these books in incorporated into this application by reference as if set forth in full below.

What is claimed is:

1. A video signal mixer, comprising:
   (a) first and second generator means for providing first and second analog video signals containing first and second video data, respectively;
   (b) third generator means for providing a third analog video signal containing third video data which can vary, at video data rate, independently of said first and second video data; and
   (c) analog switch means having:
      (i) first and second inputs for receiving said first and second analog video signals, respectively;
      (ii) a third switch select input for receiving said third analog video signal; and
      (iii) an output providing an output signal, said output signal being selected from said first and second analog video signals in dependence upon said third analog video signal.

2. A mixer as claimed in claim 1, wherein said third analog video signal is supplied to said analog switch means via an input comparator.

3. A mixer as claimed in claim 2, wherein the input comparator comprises:
   an ECL comparator having:
      a first input receiving a reference DC voltage;
      a second input receiving said third analog video signal; and
      an ECL output;

an ECL/TTL converter for receiving said ECL output from said ECL converter, and for providing a TTL output;

a TTL buffer for receiving said TTL output from said ECL/TTL converter, and for providing a TTL-differential signal to said switch select input of said analog switch means; and first and second cables adapted to supply said first and second analog signals from said first and second generator means to said analog switch means, each of said first and second cables having a first length, said third analog video signal being supplied from said third generator means to said comparator by a third cable of a second length, said first length being longer than said second length by an amount effective to delay said first and second analog video signals by an amount equal to a delay introduced into said third analog video signal by said input comparator.

4. A mixer as claimed in claim 2, wherein said input comparator and said analog switch means are operated by different supply voltages.

5. A mixer as claimed in claim 1, wherein said first and second analog video signals are supplied to said analog switch means via first and second unity gain buffers, respectively.

6. A mixer as claimed in claim 1, wherein said first to third generator means comprise:

first to third video processor means, respectively, for providing digital signals; and first to third digital-to-analog converters which provide said first to third analog video signals from said digital signals, respectively.

7. A mixer as claimed in claim 1, wherein said first to third generator means are synchronized by a common pixel clock.

8. A mixer as claimed in claim 1, wherein said first to third video signals are of the same video signal standard.

9. A mixer as claimed in claim 8, wherein said video signal standard is one of RS-343A or RS-170.

10. A mixer as claimed in claim 1, wherein:

said first and second analog video signals each comprise first, second and third component signals; and said analog switch means comprises first, second and third analog switches, wherein:

said first analog switch receives said first component signals of said first and second analog video signals;

said second analog switch receives said second component signals of said first and second analog video signals;

said third analog switch receives said third component signals of said first and second analog video signals; and said first to third analog switches have switch select inputs commonly receiving said third analog video signal.

11. A method for merging two or more analog video signals carrying pixel data, under control of a third analog video signal, comprising the steps of:

(1) providing first and second analog video signals containing first and second video data, respectively;

(2) providing a third analog video signal containing third video data which can vary, at video data rate, independently of said first and second video data; and (3) generating an output signal selected from said first and second analog video signals in dependence upon said third analog video signal.

12. The method of claim 11, wherein the third step further comprises the step of providing said third analog video signal to an analog switch means via an input comparator.

13. The method of claim 12, wherein the step of providing said third analog video signal to said analog switch means via an input comparator further comprises the steps of:

nominalizing said third analog video signal via an ECL comparator having a reference DC voltage as a first input and said third analog video signal as a second input;

converting an ECL output of said comparator to a TTL compatible signal via an ECL/TTL converter; and buffering said TTL signal for providing a TTL-differential signal to said switch select input of said analog switch means.

14. The method of claim 13, further comprising the steps of:

generating said first and second analog signals in first and second signal generators, respectively, and propagating said first and second analog signals through first and second cables, respectively to said analog switch means; and propagating said third analog signal through a third cable of a length shorter than the length of said first and second cables by an amount effective to cause a propagation delay of said first and second analog video signals substantially equal to a delay introduced into said third analog video signal by said input comparator.

15. The method of claim 12, further comprising the step of operating said input comparator and said analog switch means by different supply voltages.

16. The method of claim 12, further comprising the step of supplying said first and second analog video signals to said analog switch means via first and second unity gain buffers, respectively.

17. The method of claim 14, further comprising the step of providing digital signals for first to third digital-to-analog converters to provide said first to third analog video signals from said digital signals, respectively, wherein said first to third digital-to-analog converters comprise first to third video processor means within said first to third generator means.

18. The method of claim 17, further comprising the step of synchronizing said first to third generator means by a common pixel clock.

19. The method of claim 11, further comprising the step of providing said first to third video signals at the same video signal standard.

20. The method of claim 19, further comprising the step of providing said first to third video signals at the same video signal standard of RS-343A or RS-170.

* * * * *